United States Patent
Kakizaki et al.

(10) Patent No.: US 7,618,180 B2
(45) Date of Patent: Nov. 17, 2009

(54) KNEADING DISK APPARATUS

(75) Inventors: Jun Kakizaki, Hiroshima (JP);
Katsuhiro Oda, Hiroshima (JP);
Hiroaki Shintani, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 53 days.

(21) Appl. No.: 10/892,468

(22) Filed: Jul. 16, 2004

(65) Prior Publication Data
US 2005/0013192 A1    Jan. 20, 2005

(30) Foreign Application Priority Data
Jul. 17, 2003    (JP)    ............... P2003-276016

(51) Int. Cl.
*B29B 7/46*    (2006.01)
(52) U.S. Cl. .............................. 366/82; 366/84; 366/90
(58) Field of Classification Search ................ 425/204, 425/208; 366/82, 84, 85, 319, 81, 90
See application file for complete search history.

(56) References Cited

U.S. PATENT DOCUMENTS

| | | | | | |
|---|---|---|---|---|---|
| 215,372 A | * | 5/1879 | Kuehne | ................... | 165/109.1 |
| 505,975 A | * | 10/1893 | Fate | .............................. | 366/85 |
| 3,195,868 A | * | 7/1965 | Loomans et al. | .............. | 366/85 |
| 3,216,706 A | * | 11/1965 | Loomans | ..................... | 366/85 |
| 3,618,902 A | * | 11/1971 | Brennan | ..................... | 366/301 |
| 4,940,329 A | * | 7/1990 | Dienst | ......................... | 366/75 |
| 5,419,919 A | * | 5/1995 | Song et al. | ..................... | 426/5 |
| 2001/0019729 A1 | * | 9/2001 | Inoue | ......................... | 425/204 |

FOREIGN PATENT DOCUMENTS

| | | |
|---|---|---|
| JP | 11-010709 A | 1/1999 |
| JP | 2001-260208 A | 9/2001 |
| JP | 2002-103422 A | 4/2002 |

* cited by examiner

*Primary Examiner*—David L Sorkin
(74) *Attorney, Agent, or Firm*—Sughrue Mion, PLLC (57) ABSTRACT

A kneading disk has a plurality of disk elements having flight tips arranged at a helix angle $\theta$ in a direction supporting main streams of a resin. The flight tips of every two adjoining disks have a clearance formed therebetween. The resin is kneaded by undergoing dispersion and distribution without having any excessive temperature elevation in approximately three kinds of streams, i.e. its main streams flowing along the flight tips, its back streams through the clearances and its tip riding streams flowing over the flight tips.

12 Claims, 8 Drawing Sheets

KNEADING DISK APPARATUS

This application is base on Japanese Patent Application No. 2003-276016, which is incorporated herein by reference.

BACKGROUND OF THE INVENTION

1. Field of the Invention

The present invention relates to a kneading disk for a co-rotating twin-screw kneader or extruder used mainly for kneading plastic, a disk element therefor and a kneading process.

2. Description of the Related Art

It has hitherto been usual to combine a feed wing, a return wing, a reverse flight, a seal ring, a neutral wing, etc. for a kneading screw used in a kneader or extruder for plastic to realize an intended kneading performance.

The feed and return wings are of the rotor type in which the flight tips of a kneading screw form a continuous helix, or of the kneading disk type which is composed of multiple disk elements arranged along a screw axis and having flight tips arranged discontinuously and helically in parallel to the screw axis. Kneading is performed mainly by these screws.

The reverse flight is a full flight having a flight helix direction opposite the normal (or forward) and is used for blocking purpose by virtue of its pushback action.

The seal ring is a flange-like ring and is used for blocking purpose by virtue of its resistance to passage through a clearance defined between the inside diameter of a cylinder and the outside diameter of the ring.

The neutral wing does not have a transporting power itself, but has a kneading power. The rotor type neutral wing usually has a flight tip parallel to the screw axis and the kneading disk type neutral wing has its transporting power eliminated by adjusting the shift angle of disk elements arranged along the screw axis to usually 90° when the kneading screw has a double-flight cross section, or 60° when it has a triple-flight cross section.

There are two types of kneading methods, i.e. a method of the dispersion type relying upon shear stress or energy produced by causing dough to flow into the tip clearance defined between the inner wall of a cylinder and the tips of a kneading screw, and a method of the distribution type in which dough is generated by being circulated through a kneading zone defined by a cylinder and a kneading screw.

The rotor type kneading screw is usually considered as the dispersion (shearing) type, and the kneading disk type as the distribution (stirring) type, and they are selected in accordance with the kneading performance as intended.

That is, the rotor type is mainly used when the desired kneading performance is mainly of dispersion, and the kneading disk type is mainly used when it is mainly of distribution.

The kneading disks as hitherto disclosed in the related art include a kneading disk of improved wear resistance and a method of manufacturing such a kneading disk (see JP-A-11-10709), a kneading screw piece body enabling kneading at a low temperature and exhibiting a self-cleaning action satisfactorily (see JP-A-2001-260208) and a kneading disk having a convexly curved surface for kneading a resin without compressing a needle-shaped filler excessively (see JP-A-2002-103422).

The following is an outline of the kneading operation as hitherto employed for plastic.

There are two main types of kneading screws, the rotor type and the kneading disk type, as stated above.

Figure 6:
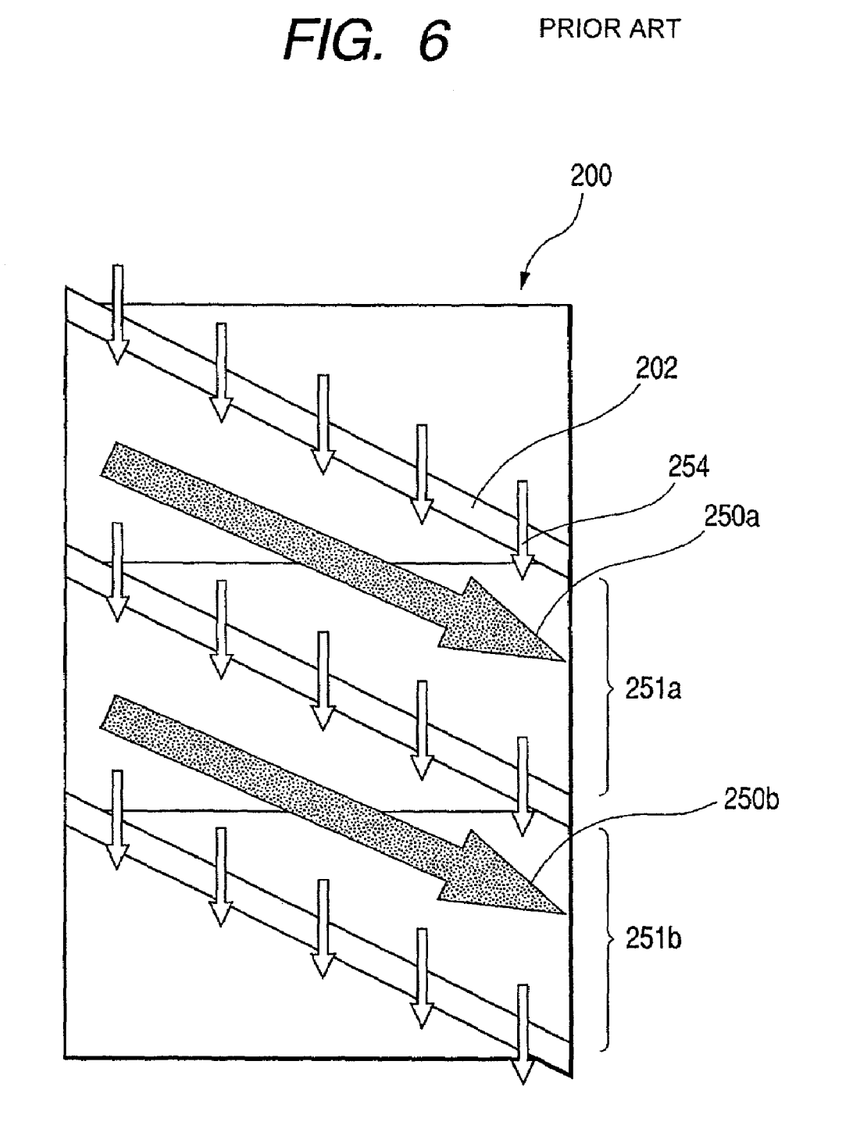
FIG. 6 is a development showing schematically the kneading of a resin by a conventional double-flight forward-feed rotor.

FIG. 6 is a development showing schematically the kneading of a resin by a conventional double-channel forward-feed rotor. The double-channel forward-feed rotor 200 is so disposed that a kneading screw flight tip 202 may form a continuous helix. The rotor type allows dispersion to take place when a part of a main stream 250a of a resin flowing in a main dough passage 251a formed by the flight tip 202 flows over the flight tip 202 into a main stream 250b, while receiving a shearing force.

Figure 7:
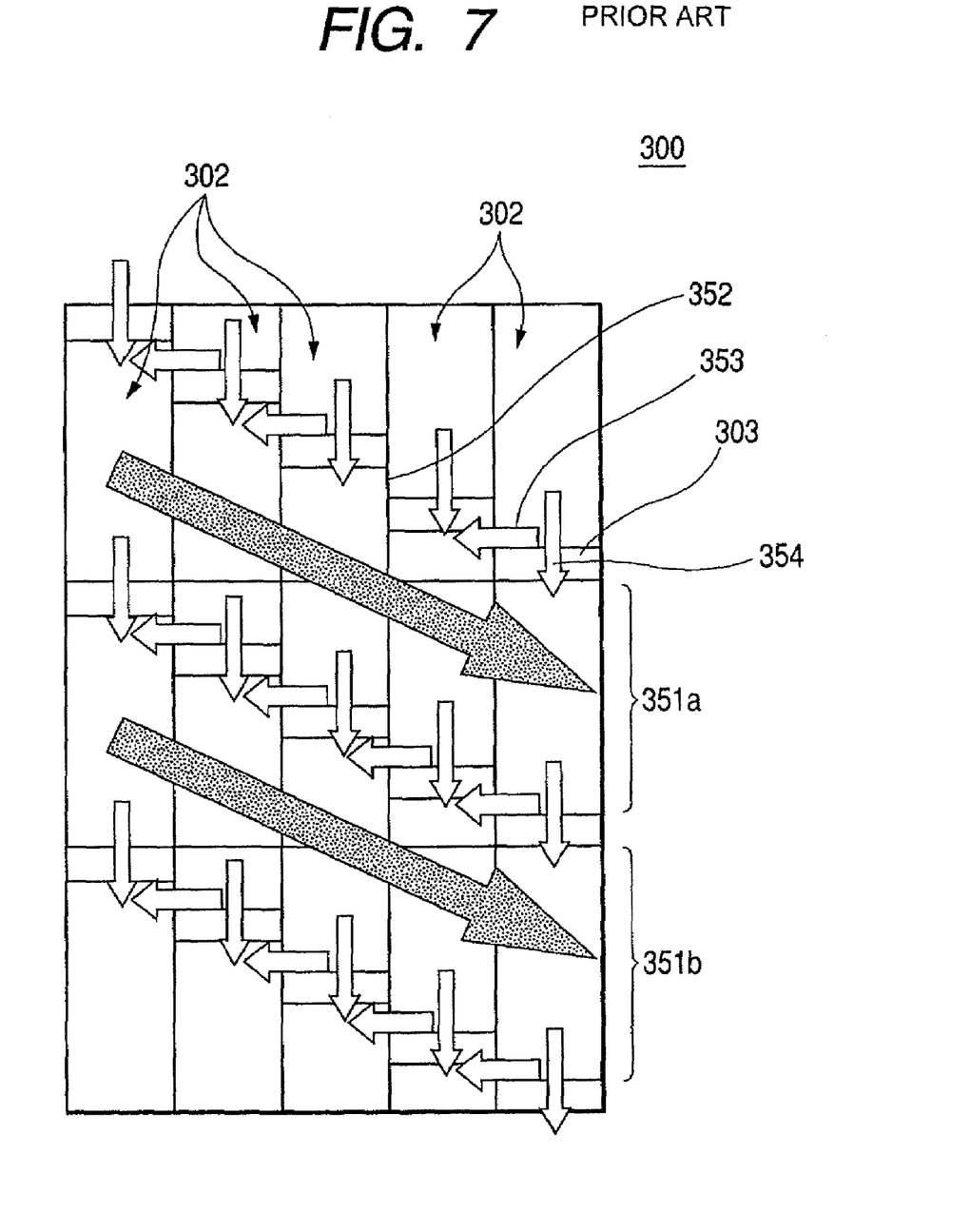
FIG. 7 is a development showing schematically the kneading of a resin by a conventional double-flight forward-feed kneading disk.
Figure 8A:
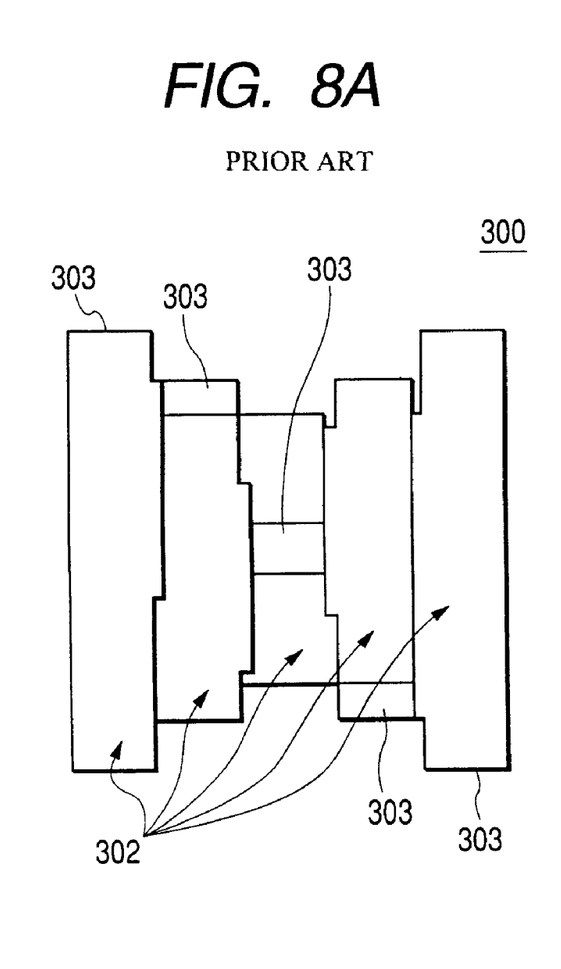
FIG. 8A is a side elevation of the conventional kneading disk shown in FIG. 7.
Figure 8B:
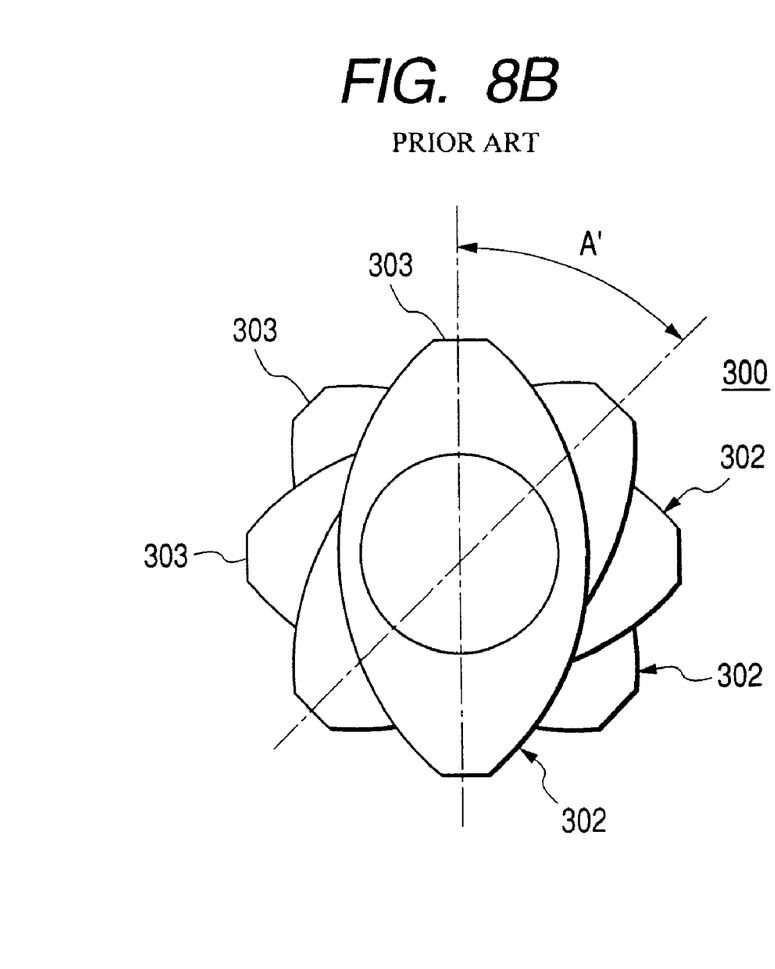
FIG. 8B is a front elevation thereof.

FIG. 7 is a development showing schematically the kneading of a resin by a conventional double-channel forward-feed kneading disk and FIG. 8A is a side elevational view of the kneading disk shown in FIG. 7, while FIG. 8B is a front elevational view thereof as taken from one axial end of the screw.

The kneading disk 300 is composed of five disk elements 302 arranged at a shift angle A' of 45° from one another so that their flight tips 303 may be shifted in position accordingly. The flight tips 303 are arranged in a discontinuous and helical pattern in parallel to the screw axis and the flight tips 303 of every two adjoining disk elements form a clearance 352 therebetween.

The rotation of the kneading disk 300 in a cylinder forms a main stream 351a flowing down a kneading zone and a part of the main stream 351a rides over each flight tip 303 and forms a tip riding stream 354 receiving a shearing force in a clearance between the flight tip 303 and the inner wall of the cylinder 30 and flowing from the main stream 351a into another main stream 351b, while each back stream 353 also flows from the main stream 351a into the main stream 351b. Thus, the kneading disk type device permits a high efficiency of dough passage over the flight tips and a high efficiency of dough distribution owing to a dwell time prolonged by the back streams 353 through the clearances 352 defined by the discontinuous flight tips 303 and is suitable for making a uniformly kneaded mixture.

The conventional kneading screws have, however, presented problems as pointed out below.

The rotor type screw has a high effect of dispersion mainly by the flight tips, but also has a high power of transporting dough due to the continuous flight tips and is likely to cause a short pass easily. In other words, the rotor type screw gives a good dispersion of dough after its passage of the flight tips and keeps a low resin temperature owing to a short pass, but is likely to produce a kneaded mixture of non-uniform quality.

On the contrary, the kneading disk type screw can produce a uniformly kneaded mixture owing to a high efficiency of dough passage to the flight tips, but is likely to cause a resin temperature elevation due to a dwell time prolonged by the back streams through the clearances between the discontinuous flight tips on every two adjoining disk elements.

The kneading screw having a blocking effect produced by a return wing, a reverse flight, a neutral wing, a seal ring, etc. occupies a large axial length in the kneading zone.

SUMMARY OF THE INVENTION

An object of the invention is to provide a kneading disk and a kneading process which do not employ any kneading screw having a blocking effect produced by a return wing, a reverse flight, a neutral wing, a seal ring, etc., but rely only upon a feed wing for exhibiting an optimum kneading condition, i.e. functions of dispersion and distribution and can keep a low resin temperature during kneading.

In order to attain the above object, the kneading disk of the invention is a kneading disk for kneading a resin disposed in a cylinder rotatably with a screw, comprises a plurality of disk elements arranged along a screw axis and each having at least two flight tips formed on their outer peripheral surfaces and inclined at a helix angle θ to a line normal to the screw axis, the disk elements being so arranged along the screw axis that the flight tips may be shifted in position from each other at a shift angle A about the screw axis.

The kneading disk of the invention may be such that the helix angle θ of the flight tips is set within a range of 0°<θ<90°, or within a range of 90°<θ<180°.

The kneading disk of the invention may be such that a tip clearance δ1 between the inner wall surface of the cylinder and the flight tips is set within a range of 0.005 to 0.06 times of the inside diameter of the cylinder, or such that the width W of each of the disk elements taken along a screw axis is set within a range of 0.1 to 0.9 times of the inside diameter of the cylinder.

The disk element of the invention is adapted for a kneading disk for kneading a resin disposed in a cylinder, the kneading disk being rotatable by a screw, the disk element comprises at least two flight tips formed on an outer peripheral surface thereof, wherein the flight tips are formed on the outer peripheral surface so as to have a helix angle θ to a line normal to the screw axis.

The disk element of the invention may be such that the helix angle θ of the flight tips is set within a range of 0°<θ<90°, or within a range of 90<θ<180°.

The kneading process of the invention is a process for kneading a resin by a twin-screw extruder having a kneading disk according to the invention, including the step of kneading a resin as it flows in main streams along main dough passages defined by the flight tips, in tip riding streams in which the resin rides over the flight tips and flows through clearances between the inner wall surface of the cylinder and the flight tips and in back streams in which it flows through clearances formed in the flight tips.

The twin-screw extruder of the invention comprises a kneading disk, a cylinder, and a screw, wherein the kneading disk includes a plurality of disk elements arranged along a screw axis and each having at least two flight tips formed on their outer peripheral surfaces and inclined at a helix angle θ to a line normal to the screw axis, and the disk elements are so arranged along the screw axis that the flight tips are shifted in position from each other at a shift angle about the screw axis.

According to the twin-screw extruder, the resin is kneaded by streams comprises main streams in which the resin flows along main dough passages defined by the flight tips, tip riding streams in which the resin rides over the flight tips and flows through clearances between an inner wall surface of the cylinder and the flight tips, and back streams in which the resin flows through clearances formed in the flight tips.

According to the invention, the flight tips of the disk elements forming a kneading disk are inclined at a helix angle θ to the screw axis and the helix angle θ can be adjusted to give any desired kneading characteristics between those of a kneading disk and those of a rotor.

Referring more specifically to the invention, it is possible to achieve a power of distribution comparable to that of a kneading disk type kneading screw in which the conventional rotor type kneading screws have been lacking, while maintaining a kneading performance based mainly upon dispersion and the property of restraining a resin temperature elevation, when the helix angle θ is 0°<θ<90°, and it is possible to achieve a kneading performance based mainly upon dispersion and the property of restraining a resin temperature elevation in which the conventional kneading disk type kneading screws have been lacking, while maintaining a high power of distribution of which the conventional kneading disk type kneading screws have been characteristic, when the helix angle θ is 90°<θ<180°.

DETAILED DESCRIPTION OF THE PREFERRED EMBODIMENTS

Description will now be made of the best modes of carrying out the invention with reference to drawings.

First Embodiment

Figure 1A:
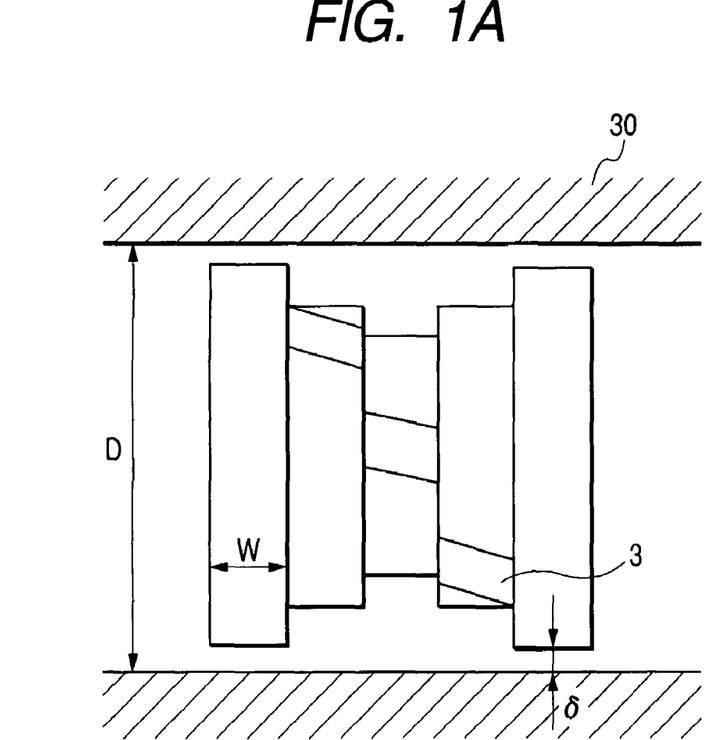
FIG. 1A is a side elevation of a double-flight forward-feed kneading disk of the improved productivity type according to a first embodiment of the invention.
Figure 1B:
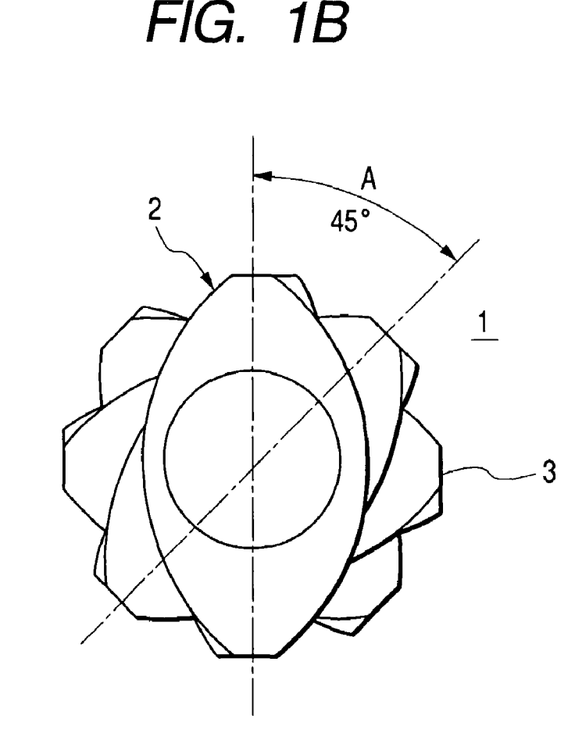
FIG. 1B is a front elevation thereof.
Figure 2:
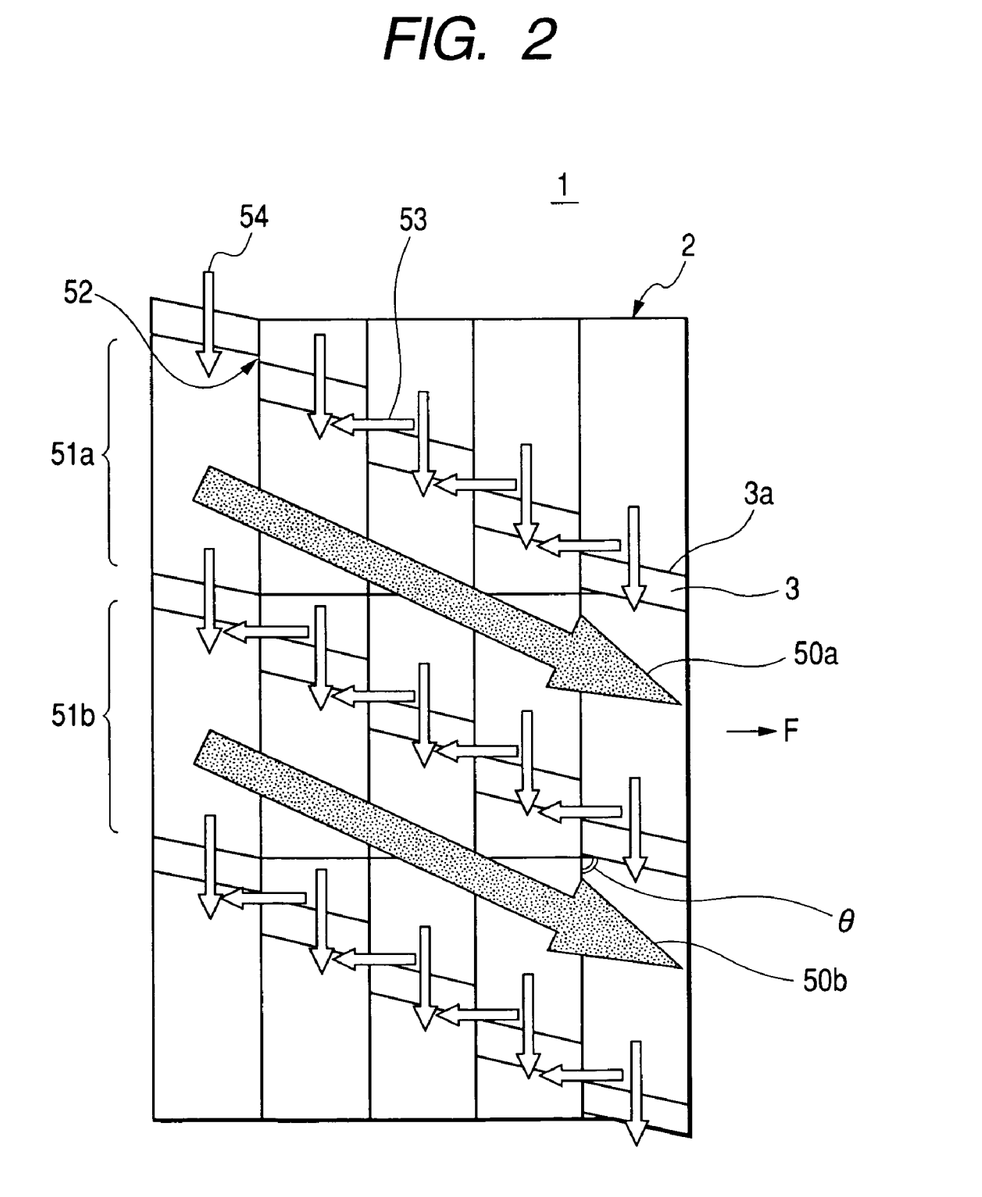
FIG. 2 is a development showing schematically the kneading of a resin by the kneading disk according to the first embodiment of the invention.

FIG. 1A is a schematic side elevation of a double-channel forward-feed kneading disk of the improved productivity type according to a first embodiment of the invention as installed in a cylinder and FIG. 1B is a front elevation thereof. FIG. 2 is a development showing schematically the kneading of a resin by the kneading disk shown in FIGS. 1A and 1B.

The kneading disk 1 is composed of five disk elements 2 arranged at a shift angle A of 45° so that their flight tips 3 may be shifted in position from one another accordingly about a screw axis not shown. Each disk element 2 is substantially oval in shape as viewed from one axial end of the screw and has two flight tips 3 formed at the opposite ends, respectively, of its long diameter. Although the kneading disc 1 shown in FIG. 1A has a shift angle A of 45°, the invention is, of course, not limited thereto, but the kneading disc may also have a shift angle A other than 45°, such as 30° or 60°, depending upon the desired operating condition.

The kneading disk 1 is housed rotatably in the cylinder 30 of a co-rotating twin-screw extruder and the clearance between the flight tips 3 and the inner wall of the cylinder 30, or the tip clearance is optimized to control the amount of dough flowing into the tip clearance and an increase in shear stress at a high viscosity resulting from a drop in resin temperature to optimize an improved performance in dispersion and a drop in resin temperature. The tip clearance δ1 relative to the inside diameter D of the cylinder 30 is preferably controlled within a range of δ1=0.005 to 0.06D. The tip clearance δ1 which is smaller than 0.005D does not allow dough to flow effectively into the tip clearance between the flight tips 3 and the inner wall of the cylinder 30, while the tip clearance δ1 which is too large results in a low shear rate at the tips and a short pass occurring at the tips. The width W of each disk element 2 along the screw axis and relative to the inside diameter D of the cylinder is preferably within a range of W=0.1 to 0.9D.

FIG. 2 is a development showing schematically the flow of the resin kneaded by the kneading disk 1 having the flight tips 3 with a helix angle θ. Although each disk element 2 has two flight tips 3 formed on its outer periphery as shown in FIG. 1B, the development in FIG. 2 shows three flight tips 3 on each disk element 2 to explain the direction of flow of the resin being kneaded.

The kneading disk 1 is mainly intended for achieving improved productivity and a decrease in resin temperature and the flight tips 3 of the disk elements 2 defining main dough passages 51a and 51b for the resin are arranged at a helix angle θ in the direction in which the resin will form main streams 50a and 50b. The helix angle θ of the flight tips 3 of the kneading disk 1 intended mainly for achieving improved productivity and a decrease in resin temperature is 0°<θ<90° as viewed in the direction of the front end of the screw axis shown by an arrow F in FIG. 2, when the angle normal to the screw axis is 0°. The arrangement of the flight tips 3 at such an angle forms between the flight tips 3 of every two adjoining disks clearances 52 through which back streams 53 flow substantially in the opposite direction to the main streams 50a and 50b. Accordingly, the kneading disk 1 forms approximately three kinds of resin streams, i.e. the main streams 50a and 50b, back streams 53 and tip riding streams 54 in which the resin rides over the flight tips 3.

The rotation of the kneading disk 1 in the cylinder forms the main stream 50a flowing down the kneading zone and a part of the main stream 50a flowing along the surfaces 3a of the flight tips 3 rides over each flight tip 3 and forms the tip riding stream 54 receiving a shearing force in the clearance between the flight tip 3 and the inner wall of the cylinder 30 and flowing from the main stream 50a into the main stream 50b, while each back stream 53 also flows from the main stream 50a into the main stream 50b.

The kneading disk 1 intended mainly for achieving improved productivity and a decrease in resin temperature makes it possible to ensure the feed of the resin toward the front end of the screw and disperse the resin without causing its temperature to rise excessively, as no excessive load bears upon the resin.

The helix angle θ of the flight tips 3 is preferably in a range of 30°<θ<90°, since its value smaller than 30° results in as high a feed effect along the main streams 50a and 50b as in the case of a rotor and allows a short pass to occur easily in the kneading zone.

Thus, the kneading disk 1 of the improved productivity type according to the embodiment having multiple disk elements 2 having the flight tips 3 with a helix angle θ of 0°<θ<90° and so arranged in the direction of forward feed along the screw axis that the flight tips 3 may be arranged in a discontinuous and helical pattern at a shift angle A from one another, makes it possible to realize a power of distribution comparable to that of the kneading disk type screw in which the conventional rotor type kneading screws have been lacking, while maintaining a kneading performance based mainly upon dispersion and the property of restraining a resin temperature elevation which characterize the conventional rotor type kneading screws, as described above. Moreover, the kneading disk itself has the function of a stream blocking screw, such as a back feed wing, a reverse flight, a seal ring and a neutral wing which have hitherto been used, and the elimination of any such screw makes it possible to shorten the length of the kneading zone along the screw axis.

Second Embodiment

Figure 3:
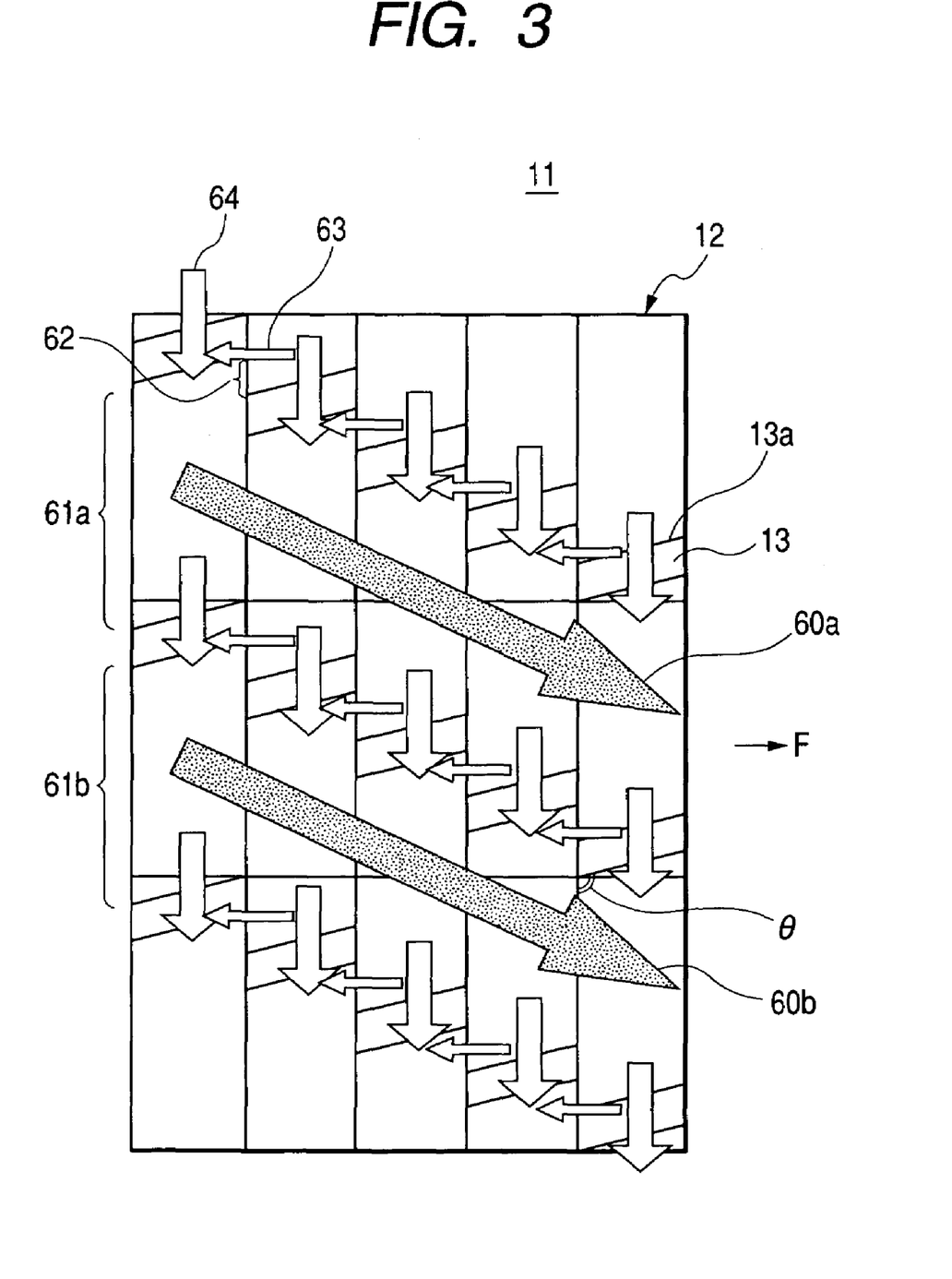
FIG. 3 is a development showing schematically the kneading of a resin by the kneading disk according to a second embodiment of the invention.

FIG. 3 is a development showing schematically the kneading of a resin by a double-flight forward-feed kneading disk of the improved dispersion type according to the invention.

The kneading disk 11 shown in FIG. 3 is mainly intended for achieving an improved performance of dispersion and the flight tips 13 of the disk elements 12 forming main dough passages 61a and 61b for a resin are arranged at a helix angle θ in a direction blocking main streams 60a and 60b of the resin. The helix angle θ of the flight tips 13 of the kneading disk 11 intended mainly for achieving an improved performance of dispersion is 90°<θ<180° as viewed in the direction of the front end of the screw axis shown by an arrow F in FIG. 3, when the angle normal to the screw axis is 0°. The arrangement of the flight tips 13 at such an angle forms between the flight tips 13 of every two adjoining disks clearances 62 through which back streams 63 flow substantially in the opposite direction to the main streams 60a and 60b. Accordingly, the kneading disk 11 forms approximately three kinds of resin streams, i.e. the main streams 60a and 60b, back streams 63 and tip riding streams 64 in which the resin rides over the flight tips 13, while receiving a strong shearing action between the flight tips 13 and the inner wall of the cylinder.

The rotation of the kneading disk 11 in the cylinder forms the main stream 60a of the resin and the resin blocked by the surfaces 13a of the flight tips 13 blocking the main stream 60a is forced to ride over each flight tip 13 as the tip riding stream 64, while receiving a strong shearing action between the flight tip 13 and the inner wall of the cylinder, and flow from the main stream 60a into the main stream 60b, while each back stream 63 also flows from the main stream 60a into the main stream 60b. This makes it possible to disperse the resin effectively.

The clearances 62 in the kneading disk 11 according to the embodiment are wider than the clearances 52 according to the first embodiment, as the helix angle θ of the flight tips 13 is greater than that of the flight tips 3 according to the first embodiment, but the kneading disk 11 is otherwise of the same basic construction as the kneading disk 1 according to the first embodiment and no detailed description thereof will be made.

The helix angle θ of the flight tips 13 is preferably from 90° to 170°, since its greater value exceeding 170°, which will bring about a higher effect in blocking the main streams, also brings about an increase in the amount of the resin in the back streams 63 through the clearances 62, a greatly prolonged dwell time for the resin in the kneading zone and thereby an elevated resin temperature, resulting in a reduction of resin viscosity preventing its effective dispersion.

The kneading disk 11 is rotatably housed in the extruding cylinder of a co-rotating twin-screw extruder as is the case with the first embodiment. The tip clearance δ1 relative to the inside diameter D of the cylinder is preferably controlled within a range of 0.005 to 0.06D as is the case with the first embodiment. The width of each disk element along the screw axis and relative to the inside diameter D of the cylinder is preferably from 0.1 to 0.9D as is the case with the first embodiment.

Thus, the kneading disk 11 of the improved dispersion type according to the embodiment having multiple disk elements 12 having the flight tips 13 with a helix angle θ of 90°<θ<180° and so arranged in the direction of forward feed along the screw axis that the flight tips 13 may be arranged in a discontinuous and helical pattern, makes it possible to realize a kneading performance based mainly upon dispersion and the property of restraining a resin temperature elevation in which the conventional kneading disk type kneading screws have been lacking, while maintaining a high power of distribution characterizing the conventional kneading disk type kneading screws, as described above.

Description will now be made of examples in which resins were kneaded by using kneading disks according to the invention.

FIRST EXAMPLE

This is an example relating to the kneading of talc with a resin for which the satisfactory feeding of talc is required.

A kneading disk according to the invention and a conventional kneading disk were compared in a capacity of feeding talc, or productivity in a process for kneading 20% of talc with polypropylene (PP) pellets having a melt index of 30 g/10 min.

The screw construction was of such a type that talc was added by a side feeder after the melting of PP.

The kneading disk according to the invention was a kneading disk 1 of the improved productivity type according to the first embodiment and having the flight tips 3 arranged at a helix angle θ of 75° in a direction supporting the main streams 50a and 50b of the resin.

A kneading disk having a helix angle θ of 0° was prepared as the conventional screw used for comparison.

Figure 4:
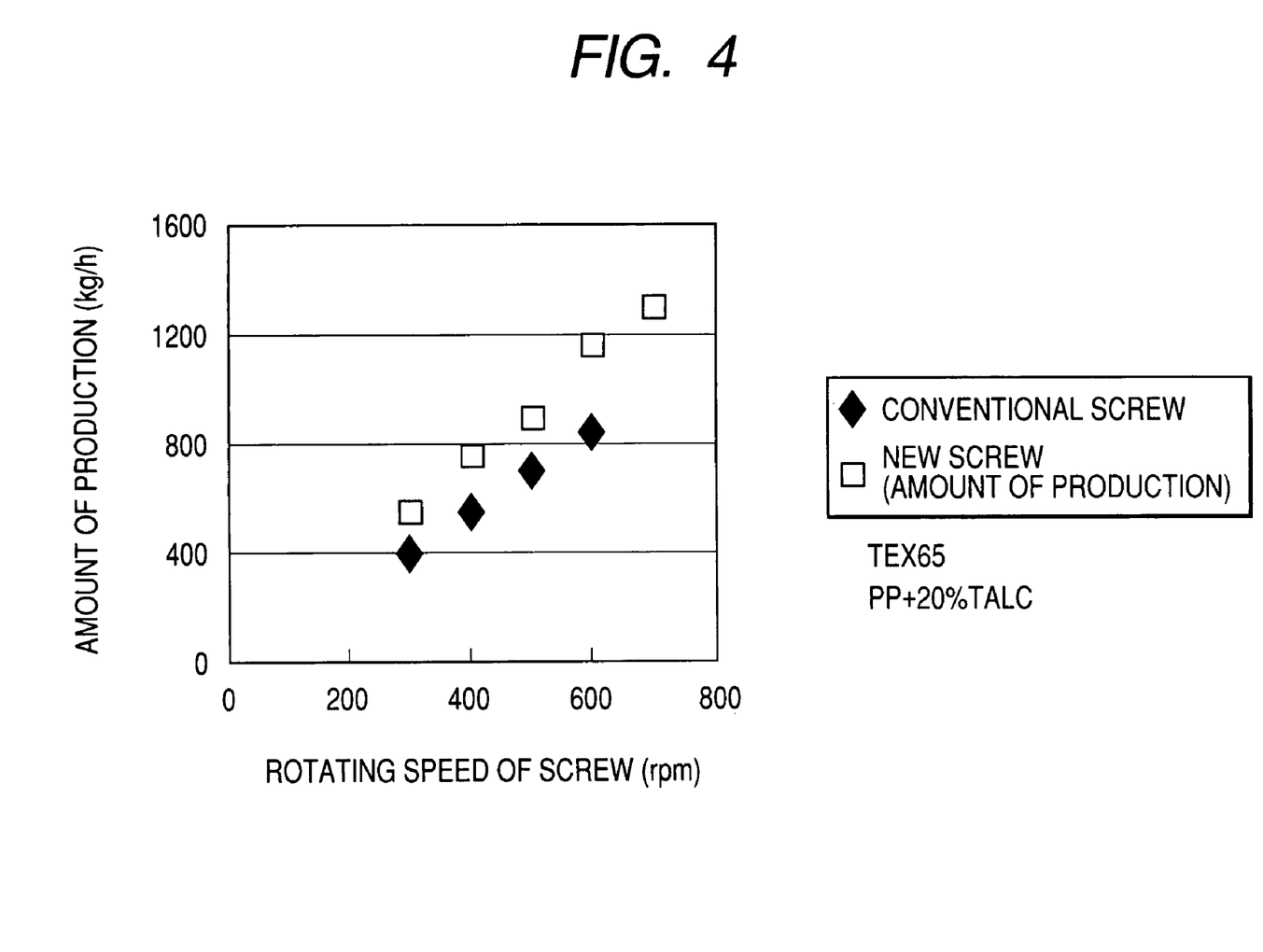
FIG. 4 is a graph showing the results of comparison in the production of a kneaded resin as obtained by using the kneading disk according to the first embodiment of the invention and by using the conventional kneading disk.

FIG. 4 shows the results of comparison in the amounts of production of a kneaded resin as obtained by using the kneading disk according to the invention and using the conventional kneading disk.

As is obvious from FIG. 4, the kneading disk according to the invention achieved a drastic improvement in production over the conventional kneading disk, since a kneaded mixture of resin and talc flowing in the passages defined by the disk elements 2 was positively fed with talc and was also subjected to an adequate shearing action, as the flight tips 3 were arranged in a direction supporting its streams.

Similar results were obtained when the kneading disk 1 according to the invention was employed in a first kneading zone in a system having two kneading zones, i.e. the first and the second arranged downstream of the first along the screw axis, and adapted to feed the raw materials together through a hopper.

SECOND EXAMPLE

This is an example relating to the kneading of carbon black with a master batch for which a good dispersion of carbon black is required.

A kneading disk according to the invention and a conventional kneading disk were compared in the dispersion of carbon black in a process for kneading 40% of carbon black with low density polyethylene (LDPE) pellets having a melt index of 20 g/10 min.

The screw construction was of such a type that carbon black was added by a side feeder after the melting of LDPE.

The kneading disk according to the invention was a kneading disk according to the second embodiment and having the flight tips 13 arranged at a helix angle θ of 105° in a direction blocking the main streams 60a and 60b of the resin.

A kneading disk having a helix angle θ of 0° was prepared as the conventional screw used for comparison.

The screw was driven at a rotating speed of 200 rpm.

Figure 5:
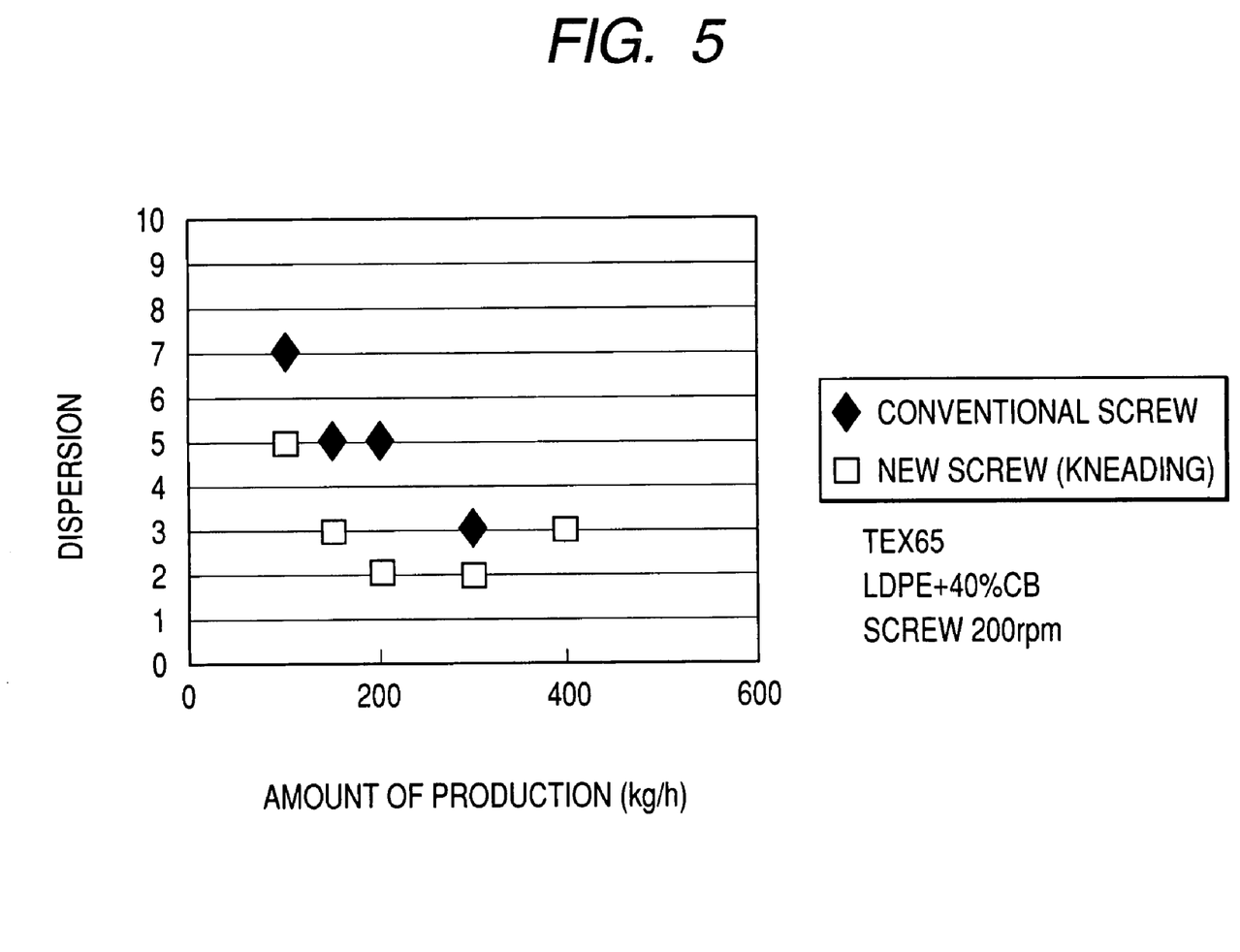
FIG. 5 is a graph showing the results of comparison in the dispersion of carbon black in its kneaded mixture with a master batch as achieved by using the kneading disk according to the second embodiment of the invention and by using the conventional kneading disk.

FIG. 5 shows the results of comparison in the dispersion of carbon black in its kneaded mixture with a master batch as achieved by using the kneading disk according to the invention and using the conventional kneading disk. The vertical scale of FIG. 5 shows the filler dispersion level indicating a degree of dispersion of the filler in the kneaded mixture. In FIG. 5, the degree of the dispersion is relatively evaluated by ten levels (level 1 indicates that the mixture is kneaded the most).

As is obvious from FIG. 5, the kneading disk according to the invention achieved a drastic improvement in the dispersion of carbon black, since a kneaded mixture of resin and carbon black flowing in the passages defined by the disk elements 12 was forced to ride over the flight tips 13 and was subjected to a strong shearing action between the flight tips and the inner wall of the cylinder, as the flight tips 13 were arranged in a direction blocking its streams.

What is claimed is:

1. A kneading disk apparatus having an input and an output defining material flow direction, said kneading disk comprising:
    a cylinder;
    a plurality of disk elements disposed in direct contact with each other in the cylinder arranged along a screw axis, each disk element comprising at least two flight tips which are formed on an outer peripheral surface and are inclined at a helix angle θ to a line normal to the screw axis,
    wherein the plurality of disk elements are so arranged along the screw axis that the flight tips are shifted in position from each other at a shift angle A about the screw axis in a direction of forward feed so as to have a helical pattern and to feed a material in the direction of forward feed; and
    the flight tips of every disk element have substantially the same helix angle within a range of 90°<θ<180°, and extend at substantially the same height along an entire width of each disk element, wherein the flight tips extend in a direction of back feed to block the fed material;
    wherein a width of the disk element taken along the screw axis is set within a range of 0.1 to 0.9 times of an inside diameter of the cylinder.

2. The kneading disk according to claim 1, wherein a tip clearance between an inner wall surface of the cylinder and the flight tips is set within a range of 0.005 to 0.06 times of an inside diameter of the cylinder.

3. The kneading disk according to claim 1, wherein the disk elements have a substantially oval shape as viewed from an axial end of the screw.

4. The kneading disk according to claim 1, wherein the shift angle A is set within a range of 0°<A<90°.

5. The kneading disk according to claim 4, wherein the shift angle A is set within a range of 30°≦A≦60°.

6. The kneading disk according to claim 5, wherein the shift angle A is set at 45°.

7. The kneading disk apparatus according to claim 1, wherein the flight tips of each disk element are shifted such that the flight tips of one disk element lead the flight tips of the next disk element in the flow direction as the plurality of disk elements rotate counterclockwise when viewed in the forward feed direction.

8. The kneading disk apparatus according to claim 1,
wherein the shift angle A is within a range of 30°<A<60° about the screw axis as viewed in the direction of forward feed, and
wherein the helix angle is within the range of 90°<θ<180° as viewed in the forward feed direction.

9. A twin-screw extruder having an input and an output defining a material flow direction, said extruder comprising:
a kneading disk;
a cylinder; and
a screw,
wherein the kneading disk includes a plurality of disk elements arranged along a screw axis and each disk element comprising at least two flight tips formed on an outer peripheral surface of the disk element and inclined at a helix angle θ to a line normal to the screw axis;
the disk elements are so arranged along the screw axis that the flight tips are shifted in position from each other at a shift angle A about the screw axis in a direction of forward feed so as to have a helical pattern and to feed a material in the direction of forward feed; and
the flight tips of every disk element have substantially the same helix angle within a range of 90°<θ<180°, and extend at substantially the same height along an entire width of each disk element, wherein the flight tips extend in a direction of back feed so as to block the fed material;
wherein a width of the disk element taken along the screw axis is set within a range of 0.1 to 0.9 times of an inside diameter of the cylinder.

10. The twin-screw extruder according to claim 9, wherein the resin is kneaded by streams comprising:
main streams in which the resin flows along a plurality of main dough passages defined by the flight tips;
tip riding streams in which the resin rides over the flight tips and flows through a plurality of clearances between an inner wall surface of the cylinder and the flight tips; and
back streams in which the resin flows through a plurality of clearances formed in the flight tips.

11. The kneading disk according to claim 9 wherein the flight tips of each disk element are shifted such that the flight tips of one disk element lead the flight tips of the next disk element in the flow direction as the plurality of disk elements rotate counterclockwise when viewed in the forward feed direction.

12. The twin-screw extruder according to claim 9,
wherein the shift angle A is within a range of 30°<A<60° about the screw axis as viewed in the direction of forward feed, and
wherein the helix angle is within the range of 90°<θ<180° as viewed in the forward feed direction.

* * * * *